United States Patent [19]

Zekowski

[11] Patent Number: 5,387,066

[45] Date of Patent: Feb. 7, 1995

[54] ELECTRICAL FIXTURE INSTALLATION ASSIST METHOD AND MEANS

[76] Inventor: Gerald I. Zekowski, 8256 E. Praire, Skokie, Ill. 60076

[21] Appl. No.: 936,578

[22] Filed: Aug. 27, 1992

[51] Int. Cl.$^6$ ............................................. F16B 35/00
[52] U.S. Cl. ..................................... 411/390; 174/48
[58] Field of Search ........................... 411/390; 174/48

[56] References Cited

U.S. PATENT DOCUMENTS

| 1,129,024 | 2/1915 | Smith . | |
|---|---|---|---|
| 1,676,486 | 7/1928 | Frederickson | 285/189 X |
| 1,690,941 | 11/1928 | Nickerson . | |
| 1,693,396 | 11/1928 | Littleton . | |
| 1,882,312 | 10/1932 | Aspinwall | 248/343 |
| 2,671,821 | 3/1954 | Zientowski et al. | 174/54 |
| 2,808,172 | 10/1957 | Buckels | 220/3.4 |
| 2,967,928 | 1/1961 | Wolar | 240/78 |
| 3,258,887 | 7/1966 | Mostoller | 411/390 X |
| 3,433,886 | 3/1969 | Myers | 174/57 |
| 4,988,067 | 1/1991 | Propp et al. | 248/343 |
| 5,085,393 | 2/1992 | Ryan | 248/343 |

Primary Examiner—Leo P. Picard
Assistant Examiner—D. A. Tone
Attorney, Agent, or Firm—Sidney N. Fox

[57] ABSTRACT

A method for assisting in the installation of an electrical fixture and an electrical fixture installation assist device formed as an attachment bolt formed as an elongate rod member capable of engagement with the attachment tab of a junction box, a weakened portion provided along the length of the elongate rod at a selected location, at least one end of the rod capable of passing through suitable openings in the fixture, a fastener carried by the end of the rod which extends through the openings in the fixture, the fastener capable of temporarily supporting the fixture adequately spaced from the junction box to facilitate completion of the electrical connection between the junction box and the electrical device carried by the fixture, the fixture capable of being raised along the elongate rod to a level above the weakened portion, the rod capable of being severed at the weakened portion upon the fixture reaching the level and the fastener adapted to be engaged with the remainent portion of the rod member for permanently supporting the fixture at the level. The attachment bolt may be formed of a single rod or a combination of a rod and enlarged headed bolt coupled thereto.

16 Claims, 2 Drawing Sheets

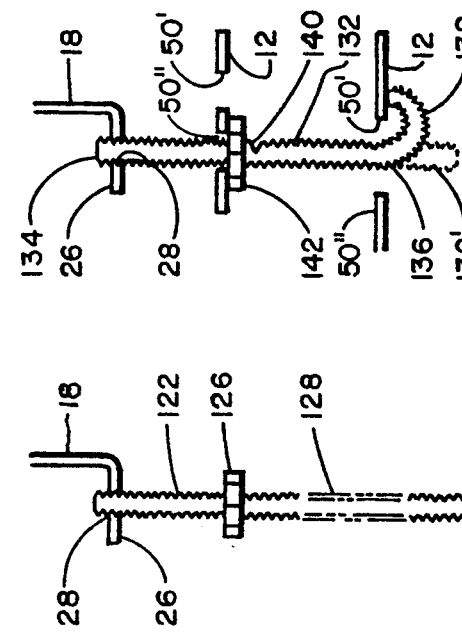
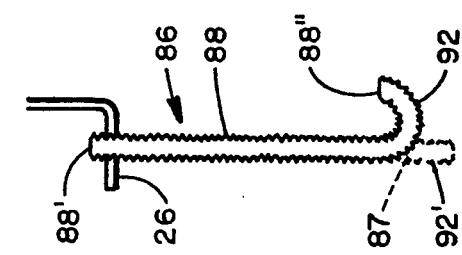
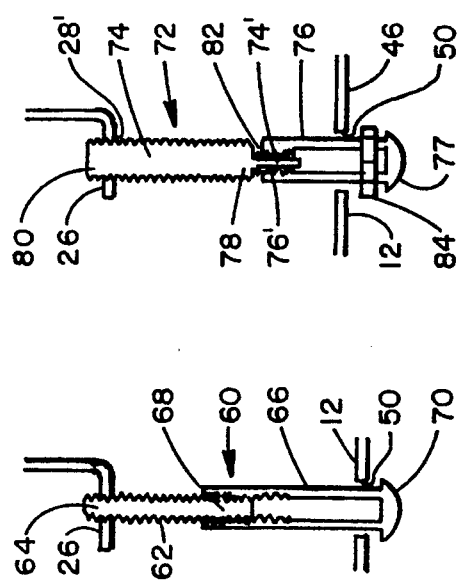
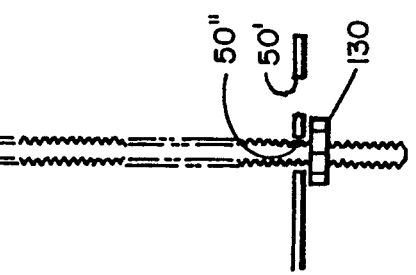
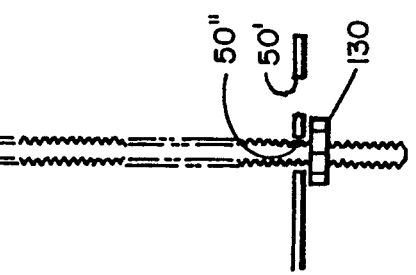
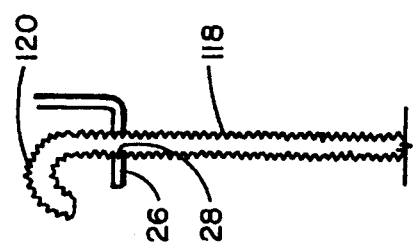
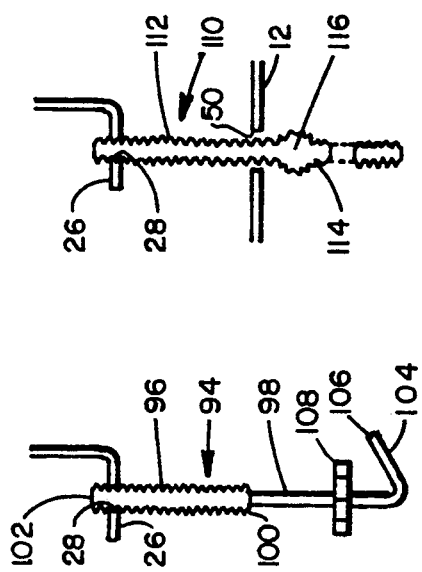

ELECTRICAL FIXTURE INSTALLATION ASSIST METHOD AND MEANS

FIELD OF THE INVENTION

This invention relates generally to the installation of electrical fixtures carrying electrical devices, such as lighting, ceiling fans and the like. More particularly, the invention provides means for temporarily supporting a mountable electrical fixture during the installation thereof, said means further providing permanent support for the electrical fixture once wired and installed.

BACKGROUND OF THE INVENTION

One of the common difficulties encountered during the installation of electrical fixtures, particularly where the fixture is suspended from the ceiling of an enclosure, is the difficulty in supporting the fixture during the establishment of electrical connection to the electrical leads housed in an electrical junction box.

Whether installing an electrical fixture to a ceiling mounted junction box or to a wall mounted junction box, the electrician is required manually to hold the fixture temporarily while he joins the electrical lead wires housed in a previously installed electrical junction box to the electrical device carried by the fixture. It is difficult and clumsy to hold a fixture and, at the same time, connect the wires. This activity must be performed while the electrician installer must maintain balance often while standing upon a ladder at a distance from ground level. While in such precarious position, the electrician must stretch and reach above his head, in installing ceiling mounted fixtures, while maintaining such precarious position, guiding and feeding the connecting bolts into the threaded openings carried by the small tabs of the junction box, connecting the lead wires from the junction box to the electrical wires of the electrical device (as by tying their ends together and capping the connecting leads) and locating and guiding the bolt connectors which have been secured to the junction box to the openings (passages) formed in the electrical fixture. The manipulations required are difficult due to the minimum available space between the junction box and the fixture during the installation process, if the fixture were to be supported by coupling to said connecting bolts. Otherwise, during the conventional installation process, the fixture must be hand held temporarily by the electrician during the installation process. This procedure is difficult, clumsy and presents considerable danger to the electrician.

The connecting bolts conventionally may be pre-installed in the tabs carried by the junction box. In such installations, the fixture itself must be moved into position, aligned with and engaged with said connecting bolts. As the electrical connections have been made, and the electrical fixture is moved closer to the junction box, the view of the openings carried by the junction box which must be aligned with the said bolts, becomes at least partially blocked and often fully blocked from view. Likewise, the connecting bolts themselves, often become blocked from view by the fixture. This requires the electrician to probe, often "blindly", by touch sensitivity and trial and error, to locate and align the fixture openings with the connecting bolts-all at the same time maintaining balance, supporting the fixture with one hand and manipulating both fixture and connecting bolt.

The problem to which the invention is directed has been recognized for some time but fails to come up with any device which is capable of supporting the fixture temporarily during the installation stage, leaving sufficient space between the fixture and the electrical junction box so as to facilitate establishment of the electrical connection, as well as serving to align the respective holes in the fixture and junction box tabs, to guide the fixture into position for permanent attachment to the junction box. It would be most helpful further to provide means which can also function permanently to attach the fixture to the junction box, position the fixture in completed installation condition and as well to guide the junction box into such position, facilitating completion of the installation. Of course, the fixture installation means provided should enable substantial reduction in the installation cost and time of installation while materially reducing the incidence of accidental fall and accompanying injury to the one performing the installation.

One example of an early prior approach to the installation of electrical fixtures to ceiling mounted junction boxes or the like include Nickerson U.S. Pat. No. 1,690,941, which discloses an annulus engagable with a lamp socket carried by the fixture and a bracket securable on a depending stud carried by the outlet box. The bracket includes depending toothed legs and the annulus includes resilient engaging means such as a slide for receiving the legs of the bracket. No means are provided by Nickerson which temporarily hold the fixture while wiring takes place. The adjustability of the Nickerson means is limited.

Smith U.S. Pat. No. 1,129,024, had suggested the use of an elongate adjusting screw to enable internal wiring to be achieved prior to positioning of the fixture base to the junction box but afforded no means for temporarily supporting the fixture during the wiring process leaving the hands free to accomplish the wiring. The problems involved in the wiring process was recognized by Smith but the solution was left wanting.

Littleton U.S. Pat. No. 1,129,024, also clearly delineated the problems but offered a solution by providing a slotted bar carrying depending adjusting screws and a vertical toothed bar slidably engaged through the slot, the bar being carried by a threaded cup engagable on a nipple extending into the junction box. Raising and lowering of the fixture is accomplished by manipulation of the adjusting screws. However, no temporary support is provided for the fixture as taught by Littleton.

The Zientowski et al U.S. Pat. No. 2,671,821 discloses holding means comprising a threaded sleeve mounted on an elevated stud, the sleeve carrying a hook which is coupled to a cooperative hook carried by the fixture. The junction box is provided with an electric plug receptacle for receiving an electrical plug leading to the lighting unit. The fixture canopy can be lowered sufficiently to seat the electrical plug in the receptacle and the sleeve manipulated to raise the fixture. However, this combination is very expensive, difficult to use and still would not leave enough space free to enable the wiring connections to be made and secured properly. Additionally, its use is limited to installation of merely a few, highly speciallized fixtures.

Buckels U.S. Pat. No. 2,808,172, provides an extension which is mounted to the interior of a wall mounted outlet box and extends thereacross. The extension is provided with a drilled and tapped hole serving as a switch mounting, the extension being provided with plural scores spaced therealong so that when properly installed, excess portions of the extension can be broken off so as to avoid contact with the electical wires interior of the box. Again, no provision is made which could be applied in the installation of an electrical fixture temporarily to support same during installation yet be capable of functioning permanently to secure the fixture to junction box subsequent to the completion of the wiring process.

Wolar U.S. Pat. No. 2,967,928, provides a support for elements of a lighting fixture such as a globe, which facilitates cleaning, removal and replacement of the globe but which does not contribute to teachings to providing temporary support for the fixture during the process of wiring same to a ceiling mounted electrical junction box. The means provided by Wolar comprises a hanger including a L-shaped bracket member having a horizontal leg and a vertically disposed leg. A threaded rod extends through the horizontal leg for attachment to a bracket inturn secured to the fixture. A second leg is slidably attached to the L-shaped leg. The globe can be lowered along the threaded rod so as to gain access to the lamp. However, access to the junction box is not provided, nor is there any provision offered for holding the fixture temporarily during the wiring process.

More recently, Propp et al U.S. Pat. No. 4,988,067, provides support for a load support member but does not approach a solution to the problem of supporting a load temporarily while sufficient access is provided for enabling manipulation, say of wires at a location above the load being supported which manipulation would have to take place without visible access to the elements being manipulated, such visibility being blocked by the load.

SUMMARY OF THE INVENTION

Accordingly, the invention provides electrical fixture installation means for assisting in the installation of an electrical fixture of the type having a mounting surface carrying at least a pair of through passages spaced along the mounting surface and to a structurally mounted electrical junction box of the type including mounting tabs carrying first threaded openings capable of receiving threaded bolt means therethrough, the fixture passages capable of being aligned with the tab openings for receiving the bolt means therethrough, said installation assist means comprising the bolt means formed as at least a partially threaded elongate rod member having at least one end capable of engagement within the tab openings and an opposite end. Separation means, such as a weakened portion such as a "knock-off notch" is formed at a selected location along the rod for separating the rod at a predetermined distance from the tabs of the junction box at a time subsequent to completion of the electrical connection between the electrical device carried by the fixture and the electrical leads carried by the junction box. The fixture is constructed and arranged for slidable movement along the rod past the separation means at a time subsequent to completion of the electrical connection and retaining means are provided at the opposite end of the rod for supporting the fixture temporarily prior to completion of the electrical connection and capable of supporting the fixture permanently when the fixture has been positioned for permanent installation subsequent to operation of the separation means.

BRIEF DESCRIPTION OF THE DRAWINGS

FIGS. 3 through 10 are diagrammatic illustrations of several modified embodiments of the inventon.

DESCRIPTION OF PREFERRED EMBODIMENTS

The invention provides a method and means for assisting the installation of an electrical fixture, here being a ceiling mounted fixture, but useful in the installation of a wall mounted fixture (not illustrated).

Figure 1:
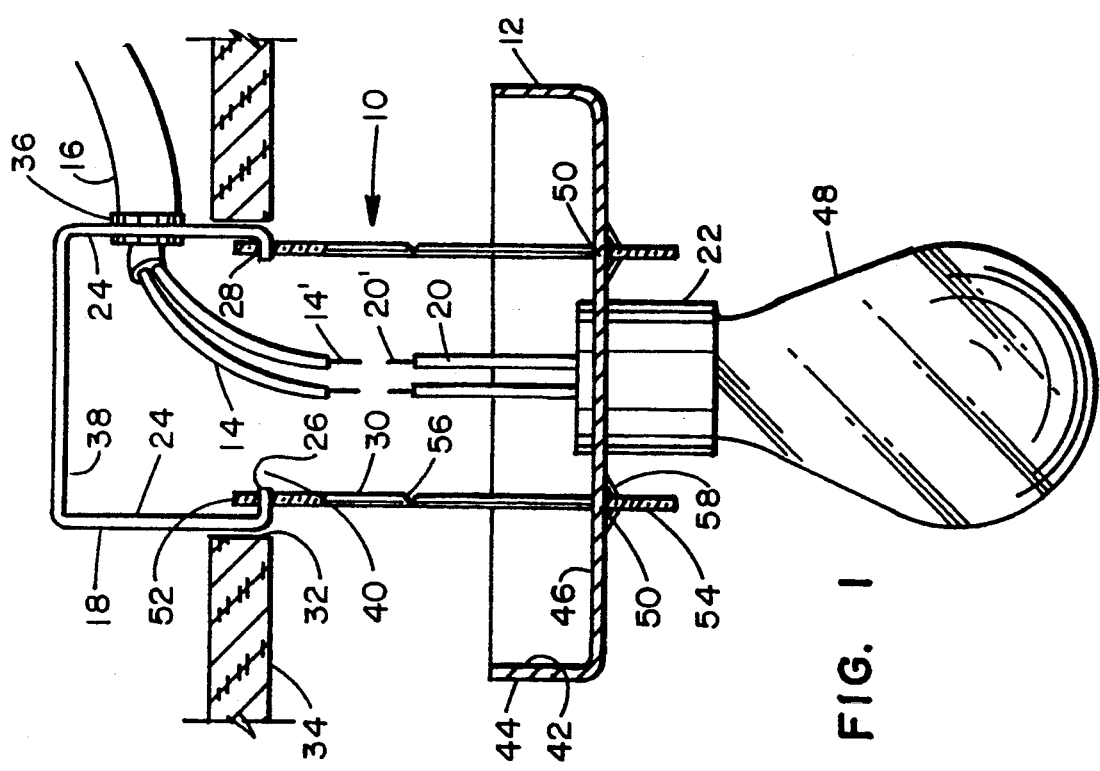
FIG. 1 is a diagrammatic elevational view of the electrical fixture installation assist means of the invention illustrated in the course of wiring of a lighting fixture to the pre-installed ceiling mounted electrical junction box during the installation thereof, portions of the FIGURE being shown in sectional representation.

The installation assist means according to the invention is designated generally in FIG. 1 by the reference character 10, said assist means being illustrated utilized in the installation of electrical lighting fixture 12. The installation process involves the making of an electrical connection between the wires 14 of electrical cable 16 housed within electrical junction box 18 and extending therefrom, and the electrical lead wires 20 leading from an electrical device, such as lamp-socket 22 carried by the fixture 12. The conventional junction box 18 can be octagonal, hexagonal, rectangular in configuration. When installed, the junction box conventionally is downwardly opening toward the fixture being installed. Conventionally, there are a pair of opposite, generally parallel walls which are provided with inwardly directed, generally coplanar attachment tabs 26, also generally referred to as ears, formed on the side walls 24 adjacent the open end of the junction box 18. The junction box 18 is provided with at least a pair of inwardly directed attachment tabs 26 on a pair of the opposite walls 24 adjacent the open end of the junction box 18. Each tab 26 also referred to by the art as ears, carries an attachment hole 28, usually threaded, for receiving an attachment bolt 30. It should be understood that in the description of the installation of the electical fixture, reference will be made to one attachment bolt. However, at least two of such bolts are required, one for each junction box tab.

Likewise, the openings provided in the fixture are at least two in number, one for each attachment bolt. A strap (not shown) may be used for certain installations to provide varying sized attachment holes for installation of different fixtures. Where provided, the straps are secured to the attachment tabs, such as tabs 26, and extend across the opening of the junction box. The attachment bolts then are secured to selected ones of the attachment holes provided on such strap.

The junction box 18 is mounted in an opening 32 constructed or otherwise formed between joists or sheetrock 34, for example, forming the ceiling of a room where the fixture 12 is to be installed. Electrical cable 16 is coupled to one of the walls 24 of junction box 18 and extends therein, say through a conventional punchout 36 formed in the wall 24. The tabs 26 extend parallel to the floor 38 of the junction box 18 and in opposite directions inwardly of the opening 40 of the junction box 18. The cable 16 carries the electrical leads 14 i.e. the power leads, terminating in lead wires 14'. Grounding wires (not shown) also are introduced within the junction box 18. The tabs 26 each carry an attachment hole 28, generally threaded, for receipt of attachment bolts used for mounting the fixture 12. The junction box 18 conventionally can be pre-installed so that the tabs 26, as well as the open ended box 18 has its walls 24 flush with the opening 32 defined in the ceiling.

The electrical fixture 12, here is represented by dish-shaped housing 42 having vertical walls 44 and a base or floor 46. As shown in FIG. 1, a lamp socket 22 is mounted through the floor portion 46 of the fixture 12, the light bulb 48 being illustrated installed therein. The floor 46 of the fixture 12 constitutes the mounting surface thereof and is provided with suitable spaced openings 50 which are to be aligned with the attachment holes 28 carried by the tabs 26 of the junction box 18. The attachment holes 28 and openings 50 must be aligned when the fixture 12 has been wired (the electrical connection established) and mounted securely positioned with its walls 44 engaged with the ceiling, permanently installed thereat. One must understand that the length of the electrical wires 14 extending out of junction box 18 and the length of the wires 20 extending from the lamp socket 22 carried by the fixture 12 is kept to a minimum, so as to enable seating thereof in the junction box 18 and in the fixture 18 respectively without shorting, overcrowding and the like which may arise when the engaged wires are pushed back into the said junction box or fully accommodated within the junction box and the fixture. Sufficient space must be provided for accommodating the electrical connection caps, insulation, shields, etc. (not shown). The connecting bolts are to be each passed through the respective aligned holes 28 and openings 50 when the fixture properly electrically connected, is lifted and positioned with the walls 44 engaging the ceiling. This task is usually performed by the electrician, who heretofore has held the fixture with one hand and effected the manipulations required to tie the wires 14 and 20' together to establish the electrical wire connection. Heretofore, instead of having the attachment bolts premounted on the junction box, i.e. in the tab holes 28, threaded bolts are inserted after the holes carried by the tabs and the openings carried by the fixture floor have been aligned. Of course, the attachment holes 28 carried by the junction box tabs 26 are hidden from the electrician's view by the fixture and the mounted lamp socket. The electrician must "poke" by touch and/or trial and error to effect proper alignment and introduction of the bolts. One could not make the bolts extra long to enable facile location and alignment of the proper attachment holes with the fixture openings since there would remain too much space between the fixture and the ceiling. One must avoid necesitating the extension of the bolts visibly from the fixture. Foreshortened bolts would avoid the extension of the bolts out from the visible portion of the mounted fixture but the problem of avoiding the alignment limitations and simultaneous awkward physical holding of the fixture would remain.

Figure 2:
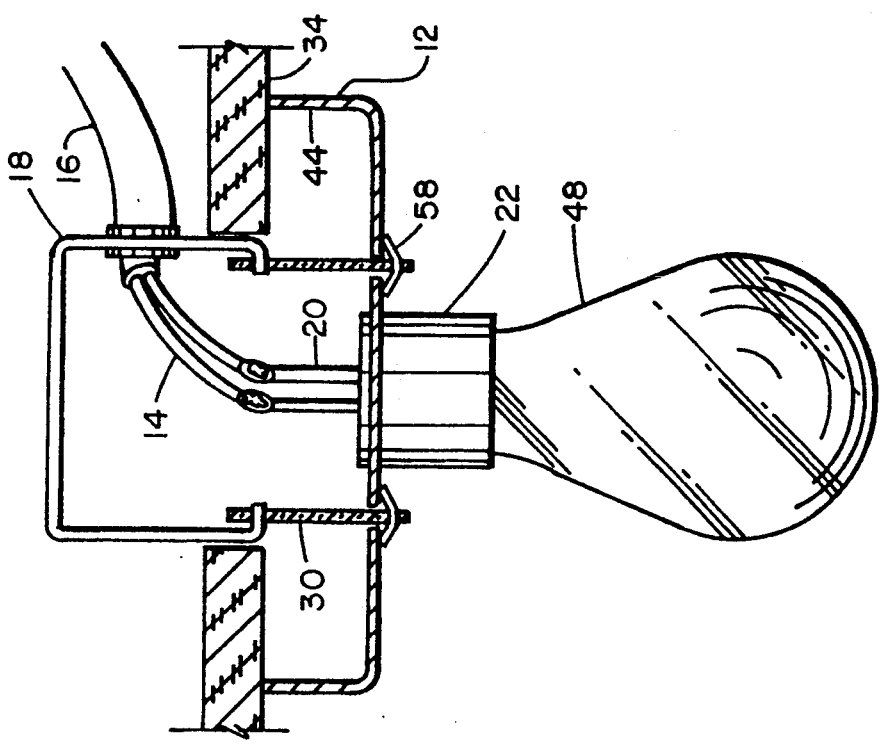
FIG. 2 illustrates the completed installation of FIG. 1.

The embodiment of the invention illustrated in FIGS. 1 and 2 provides attachment bolts 30 formed as elongate rods, each being threaded at opposite ends 52 and 54. Each rod (now designated by reference character 30) carries a notch 56 of depth to constitute the notch 56 as a knock-off notch capable of being severed from the rod easily and thus defining a weakened portion, but, nevertheless, the rod, even with the said notch 56, having strength sufficient to support the fixture 12. One end 52 of the rod 30 is secured through attachment hole 28 of tab 26, the rod 30 extending vertically downward, as illustrated. The opposite end 54 is passed through the opening 50 carried by the fixture 12. A fastener 58, such as a quick-nut, is engaged on the opposite end 54 (which extends through opening 50). The length of the rod 30 is selected to offer sufficient space to enable the electrician to perform the manipulations necessary to effect the joining, as by tying, of the wires 14 and 20' respectively while the fixture is hanging free of the electrician's grasp and supported by the fasteners.

When the wires 14 and 20' have been connected to establish the electrical connection, the fixture 12 is lifted toward the junction box 18, the fasteners 58, quick-nuts, being manipulated to enable the fixture 12 to be slidably moved along the length of the rods, the floor passing the notch 56 of each rod 30, the notch 56 having been located at a selected location chosen to be the desired distance between the fixture 12 and the ceiling when the fixture 12 is properly positioned in the installed condition. When the floor 46 of the fixture 12 passes the notches 56 carried by the respective rods 30, the quick-nuts are manipulated so that they can be slidably moved to a location above the notches 56, i.e. above the selected location. Now, the rods 30 are severed at the notches 56, the quick-nuts self-tighten to secure same in place supporting the fixture 12. The fixture 12 is held fixedly and, effectively, permanently, preferably, flush against the ceiling and supported by the fastener 58 (quick nuts).

Referring to FIG. 3, a modified embodiment of the invention is designated by reference character 60. The upper end 64 of threaded rod 62 is secured in attachment hole 28 formed in the tab 26 of the junction box 18 and depends vertically downwardly toward the fixture 12. The rod 62 supplemented by hollow internally threaded bolt 66 which is threadably engagable with the lower end 68 of said rod 62 after said bolt 66 is passed through opening 50 of the fixture. The connection between the rod 62 and the bolt 66 can be defined as the selected location at which the separation can be made between the rod 62 and hollow bolt 66, said location being chosen on the same basis as the selected location was chosen for the notch 56 formed on rod 30, the combined rod 62 and hollow bolt 66 defining the attachment bolt of the invention. The hollow bolt 66 carries a head 70 large enough to support the fixture temporarily during the installation process of the fixture.

Generally the length of the hollow bolt 66 determines the distance required to afford suffient space between the fixture 12 and the junction box 18 to enable the manipulations to be made by the electrician in the process of effecting the electrical connection with ease and without strain. When the wiring is completed, i.e. the electrical connection established, the fixture 12 is slidably, upwardly pushed along the hollow bolt 66 until reaching the desired installation position, that is, above the engagement of rod 62 and bolt 66. The bolt 66 then is removed and a fastener, e.g. a simple conventional hex nut is engaged with the rod 62, permanently supporting the fixture 12. The bolt 66 can be thereafter disgarded or reused.

Another modified embodiment of the invention is illustrated in FIG. 4 and designated generally by reference character 72. The installation assist means 72 according to the invention, is formed of a threaded rod 74 and a top-opening hollow bolt 76. The threaded rod 74 is of slightly greater diameter than rods 30 and 62, since the attachment hole 28' is of greater diameter than the attachment hole 28. The rod 74 is provided with a narrow diameter extension 74' at its lower end 78 and is engaged at its upper end 80 within attachment hole 28' carried by the tab 26 of the junction box 18. The top-opening hollow bolt 76 is provided with an internal threaded formation 76' adjacent its open end 82 conforming to the threaded extension 74' to enable engagement of said extension 74' with the hollow bolt 76. The hollow bolt 76 and the rod 74 are of the same diameter, less than the diameter of the opening 50 formed in the floor 46 of the fixture 12. A fastener, such as hex nut 84 is seated on the head 77 of the hollow bolt 76, and serves temporarily to support the fixture 12 during the installation process. The selected location for the "weakened portion" constituting the separation means of the installation assist means 70 according to the invention, is constituted by the junction of the rod 74 and its reduced diameter threaded extension 74'. The overall length of the combined rod 74 and hollow bolt 76 providing, when applied, sufficient space to enable and facilitate completion of the electrical connection. When the electrical connection has been completed, the fixture 12 is raised slidably along the hollow bolt 76 to a position above the extension 74' and the nut 84 also is slidably moved, said lower end 78 extending through the opening 50 in the fixture 12. Then the hex nut 84 is engaged with the lower end 78 of the rod 74, completing the installation, said hex nut 84 serving to support the fixture 12 permanently. After the engagement of the nut 84 with the lower end 78 of the rod 74, the hollow bolt 76 is disengaged from the rod 74 and the extension 74' severed from the rod 74. The installation thus is completed.

Referring to FIG. 5, a further modified embodiment installation assist means according to the invention is illustrated and designated generally by reference character 86. The installation assist means 86 comprises an elongate threaded rod 88 having opposite ends 88' and 88". The upper end 88' of rod 88 is engaged through attachment hole 28 carried by tab 26 of the junction box 18. The rod 88 is selected to be of a length sufficient to pass through the opening 50 of the fixture 12 so as to enable the lower end 88" to extend through the floor 46 leaving a portion 87 capable of being return bent to a hook-like configuration, said portion 87 having sufficient strength to support the fixture 12', there being enough space between the fixture and the junction box 18 to enable easy manipulations to be performed for effecting the electrical connection without strain. When the electrical connection has been completed, the fixture 12 is simply raised along the length of the rod 88 until the walls 44 of the fixture 12 engage the ceiling or otherwise the fixture reaches the desired installed position relative to the ceiling. The rod 88, including portion 87, then is severed, leaving a remnant end 92' (in broken outline) protruding from the fixture. The remnant end 92' is bent to a generally U-shaped portion 92 which serves permanently to fix the position of the fixture and support same thereat.

Referring to FIG. 6, another modified embodiment of the invention is illustrated and designated generally by reference character 94. The attachment bolt 94 according to the invention comprises elongate threaded rod 96 having a thin rod portion 98 (or wire) unitary with the lower end 100 of said rod 96. The upper end 102 of rod 96 is engaged with the attachment hole 28 carried by the tab 26 of the junction box 18. The length of the rod 96 and the thin rod portion 98 together is selected to be equal to the distance required to position the fixture relative to the ceiling to be assumed when the installation is completed. The length of the thin rod portion 98 is selected to enable said thin rod portion 98 to pass through the opening 50 of the fixture and be return bent to form a hook-like formation 104, the end 106 thereof engaging the undersurface of the floor 46 of the fixture 12, the hook-like formation 104 being of sufficient strength to support the fixture 12 temporarily during the installation process. A fastener, such as hex nut 108 is carried by the hook-like formation 104. When the electrical connection has been established, the fixture is raised along the thin rod portion 98 sufficiently to enable the nut 108 to be engaged onto the lower end of the rod 96. The thin rod portion 98 is snipped off from the rod 96 at its juncture therewith. The thin rod portion 98 may be formed as a wire.

In FIG. 7, a still further modified embodiment of the invention is designated by reference character 110 and comprises a straight rod member 112 which is engaged through the attachment hole 28 formed in the junction box tab 26. The lower end 114 of rod member 112 is passed through the opening 50 of the fixture 12. The lower end 114 of rod member 112 extending below the fixture 12 can be crimped so as to support the fixture temporarily during the installation. When the electrical connection is completed, the fixture 12 is raised along the length of the rod member 112 until it reaches its desired height for permanent installation When the wiring is completed, the fixture is slidably transported upward, along the rod member 112. The excess portion, including the crimped portion, extending through the fixture 12 is severed from the rod member 112 and the remnant portion again is crimped, as shown at 116, leaving the crimp permanently to support the fixture.

In the embodiment of the invention illustrated in FIG. 8, the upper end of elongate threaded rod 118 is engaged through the attachment hole 28 carried by tab 26 of the junction box 18 and is bent to form a hook-like formation 120. Instead of being threaded, the upper end of the rod 118 may be free of threads so as to increase the speed of engaging same in the attachment hole 28. In fact, the entire length of rod 118 may be devoid of threads, the lower end of said rod merely being return bent to form a hook-like formation (not shown).if a nut is not to be employed, the hook-like formation offering the support for the fixture during the installation process. In such case, after the electrical connection has been completed and the fixture raised along the rod 118 to its desired height, the portion of the rod extending downward from the fixture may be severed from the rod, leaving enough remainder to be return bent to form another hook-like formation for permanently supporting the fixture.

In the embodiment illustrated in FIG. 9, a hollow threaded elongate rod 122 is engaged through the threaded attachment hole 28 carried by the tab 26 of junction box 18. The lower end 124 of rod 122 is passed through the opening 50" formed in the fixture. A nut 126 may be positioned on the rod 122 at a location just above the selected location. The rod 122 includes a non-threaded portion 128 at the selected location, the portion 128 constituting the "weakened portion" and may be crimped temporarily to support the fixture after the electrical connection is completed and the fixture 12 is lifted, sliding along the bolt until reaching its permanent position. A nut 130 may be engaged on the lower end 124 to support the fixture temporarily during the installation procedure, or, the weakened portion 128 may be crimped to support the fixture during that period. A nut may be slidably moved along with the fixture after completion of the electrical connection and threadably engaged with the remnant threaded portion of the rod 122 subsequent to severance therefrom of the portion of said rod below the "weakened portion" 128. The upper and lower positioned nuts 126 and 130 offer increased support and stability to the completed installation. Alternatively, the weakened portion 128 may be increased in length and a section thereof may be retained after severance, so that it extends through the fixture attachment opening. This portion may be crimped with the crimp serving to provide the support for the installed fixture. Variations can be made from this, and the other examples of the invention without departing from the spirit and scope of the invention. The through opening in the floor of the fixture may take the form represented by keyhole formation 50' in FIG. 9. The bolt or wire end extends through the larger portion of the hole and the fixture 12 in such case, being horizontally slidable to cause the remainder of said bolt or wire to pass through the narrow portion 50" of the keyhole formation 50'. A knock-off notch can be provided along at a suitable location along the length of the bolt 122.

In FIG. 10, a considerably simplified embodiment of the invention is provided by substantially fully threaded elongate rod 132. One end 134 of said rod 132 is threadably engaged through attachment hole 28 of the junction box 18. The opposite end, 136 of rod 132 is provided with hook formation 138, conveniently formed simply by return bending said end from the generally straight end 138' represented in broken outline. A notch 140 is formed at a selected location along the length of the rod 132. A fastener, such as conventional hex-hut 142, can be provided as carried along the length of said rod 132, above the notch 140. The hook formation 138 is strong enough to support the fixture 12 during the course of its installation, i.e. wiring, etc. Once the wiring manipulations have been completed and the electrical connection thus made, the fixture 12 is slidable along the length of rod 132 until it is above the notch 140. The nut 142 is capable of passing through the larger diameter portion of the keyhole formation 50' and then, the rod 132 is severed at the "weakened portion" thereof, the notch 140, and the fixture then is slidably translated to place the remnant portion of rod 132 within the narrow portion 50" of keyhole formation 50'. The fixture 12 thus is supported by the nut 142 in permanent installation.

Other variations from the described embodiments are contemplated and are capable of being made by one skilled in the art without departing from the spirit and/or scope of the invention as defined in the appended claims.

What I claim is:

1. Electrical fixture installation assist means for assisting in the installation of an electrical fixture to a structurally mounted electrical junction box having attachment tabs and electrical lead wires extending therefrom, the electrical fixture being of the type carrying an electrical device and having a mounting surface carrying at least a pair of spaced through openings, the electrical device having electrical wires adapted to be coupled to the electrical lead wires for effecting electrical connection therebetween, the attachment tabs provided with attachment holes alignable with at least One of the through spaced openings for receiving said installation assist means therethrough for engagement therein, said electrical fixture installation assist means comprising:

at least one partially threaded elongate attachment rod having a predetermined length, at least one threaded end engagable within an attachment hole of an attachment tab and an opposite end;

manually effectable separation means at a predetermined selected location along the length of said attachment rod between the ends and spaced from said opposite end thereof enabling separation of said attachment rod at said predetermined selected location, said selected location being chosen at a predetermined distance from the attachment tabs of the structurally mounted electrical junction box;

said at least one threaded end being a threaded remnant end of said attachment rod formed upon separation of said attachment rod at a time subsequent to completion of an electrical connection between the electrical wires of the electrical device carried by the fixture and the electrical lead wires of the junction box;

said elongate attachment rod being arranged to accommodate slidable movement of the fixture along the length thereof past said manually effectable separation means to a location between said attachment tabs and said manually effectable separation means at a time subsequent to completion of said electrical connection but prior to operation of said manually effectable separation means so as to position said threaded remnant end of said attachment rod through the through opening of the fixture subsequent to operation of said manually effectable separation means; and, retaining means being a fastening member movably positioned at the opposite end of said elongate attachment rod supporting the fixture temporarily prior to completion of the electrical connection at a distance from said attachment tabs providing access sufficient to enable manipulation of said electrical wires and electrical lead wires so as to effect said electrical connection and engagable with said threaded remnant end of said attachment rod subsequent to operation of said manually effectable separation means permanently to support the electrical fixture whereby to complete the installation thereof.

2. The electrical fixture installation assist means according to claim 1 in which said manually effectable separation means comprise a manually severable break-off notch formed in said rod at said selected location.

3. The electrical fixture installation assist means according to claim 2 in which said selected location is chosen to allow a portion of said threaded remnant end of the attachment rod to extend through the spaced through opening carried by the mounting surface of the fixture when the fixture is slidably moved along said attachment rod and after the operation of said manually effectable separation means, and said fastening member is engagable with said threaded remnant end thereby effecting permanent support of said fixture.

4. The electrical fixture installation assist means according to claim 1 in which said opposite end of said rod is threaded, said manually effectable separation means comprise a thin portion of said attachment rod at said selected location and extending from the threaded opposite end thereof, said thin portion being severable from said opposite end to define said threaded remnant end and additional retaining means comprising a hook-like bent portion formed at the terminus of said thin portion effecting temporary support prior to completion of the electrical connection, said fastening member being carried by said hook-like bent portion and being engagable with said threaded remnant end subsequent to severance of said thin portion and said hook-like bent portion.

5. The electrical fixture installation assist means according to claim 1 in which said manually effectable separation means comprise a weakened portion formed in said rod at said selected location and said fastening member is engagable with the remnant end of said rod.

6. The electrical fixture installation assist means according to claim 1 in which said selected location is chosen to allow a portion of said threaded remnant end to extend through the opening carried by the fixture and said fastening member is engagable with threaded end of said rod.

7. The electrical fixture installation assist means according to claim 1 in which said manually effectable separation means comprise a thin wire integral with said threaded opposite end of said attachment rod, said wire having a return-bent end arranged to pass through said through opening carried by said fixture, said wire constructed and arranged to be severed from said threaded opposite end of said rod to define said remnant end, said selected location being the junction of said threaded opposite end of said attachment rod and said wire, and additional retaining means comprising said return-bent end of said wire effective temporarily to support said fixture while the electrical connection is effected, said fastener member being supported by said return-bent end and engagable with said threaded remnant end subsequent to severance of said wire from said attachment rod whereby to effect the permanent fixture support.

8. The electrical fixture installation assist means according to claim 7 in which said fastening member is carried by the remnant end of said attachment rod and is capable of movement along said attachment rod following the slidable movement of said fixture past said selected location subsequent to completion of said electrical connection.

9. The electrical fixture installation assist means according to claim 1 in which said manually effectable separation means comprise a weaker portion formed at the opposite end of said attachment rod and additional retaining means including an internally threaded fastening member having an enlarged head and engagable with the opposite end of said attachment rod, said fastening member being engagable with said threaded remnant end subsequent to operation of said manually effectable separation means and carried by said enlarged head of said internally threaded fastening member.

10. The electrical fixture installation assist means according to claim 1 in which said rod is at least partially hollow.

11. The electrical fixture installation assist means according to claim 1 in which said manually effectable separation means comprise an elongate hollow, at least partially threaded tubular member having an open, internally threaded end and an enlarged head at the opposite end thereof, said internally threaded end engagable with said threaded opposite end of said attachment rod, said tubular member being separable from said attachment rod to define said threaded remnant end subsequent to completion of said electrical connection and the slidable movement of said fixture past said selected location, and additional retaining means including said enlarged head of said tubular member to effect said temporary support and said fastening member is selected of size and configuration to engage said threaded remnant portion subsequent to completion of the electrical connection, said fixture being slidable to effect said permanent support after completion of the electrical connection.

12. The electrical fixture installation assist means according to claim 1 in which said manually effectable separation means comprise a narrow diameter threaded extension integral with said opposite end of said attachment rod, a hollow, internally threaded tubular member threadably engaged with said extension, said tubular member having an enlarged head and a generally uniform outer diameter body, said fixture being capable of slidable movement along the length of said tubular member carrying said fastening member past said extension, said tubular member being releasable from engagement with said extension and said threaded extension being severable subsequent to completion of said electrical connection, release of said tubular member and slidable movement of said fixture, said fastening member capable of being engaged with said rod subsequent to the slidable movement of said fixture past said selected location prior to the release of said tubular member and the severance of said threaded extension therefrom to define said threaded remnant end, said fastening member resting on said enlarged head.

13. The electrical fixture installation assist means according to claim 1 in which said opposite end of said attachment rod terminates in an upwardly bent portion, said fastening member being engaged with said opposite end of said attachment rod above said upwardly bent portion, said through opening of said fixture having a keyhole configuration including a portion of size and configuration to accommodate said attachment rod freely therethrough and a narrow portion; said fastening member being engagable with said attachment rod at a location slightly above said manually effectable separation means, said attachment rod being capable of accommodating slidable movement of said fixture along said attachment rod to said selected location past said manually effectable separation means, thereafter to permit said fixture to be slidable laterally to seat said threaded remnant end within the narrow portion of said through opening subsequent to the completion of the electrical connection and said fastening member reaching a location past said manually effectable separation means.

14. Electrical fixture installation assist means for assisting in the installation of an electrical fixture to a structurally mounted electrical junction box having attachment tabs and electrical lead wires extending from said junction box, the electrical fixture being of the type carrying an electrical device and having a mounting surface carrying at least a pair of spaced through openings, the electrical device having electrical wires adapted to be coupled to the electrical lead wires for effecting electrical connection with the electrical device, the attachment tabs carrying attachment holes alignable with the through spaced openings of the fixture for receiving said installation assist means therethrough for engagement therein; said electrical fixture installation assist means comprising:

a pair of elongate at least partially threaded attachment rods each having one end engagable within an attachment hole of an attachment tab and having a threaded opposite end;

manually effective separation means positioned predeterminedly between said one end and threaded opposite ends at a selected location along the length of said attachment rods spaced from the ends thereof for separating said attachment rods at a predetermined distance from the attachment tabs of the structurally mounted electrical junction box;

threaded remnant end portions defined by operation of said manually effectable separation means at a time subsequent to the completion of the electrical connection between the wires of the electrical device carried by the fixture and the electrical wires of the electrical junction box;

said elongate attachment rods being constructed and arranged to accommodate slidable movement of the fixture along the length thereof past said manually effectable separation means to a location between the attachment tabs and said manually effectable separation means at a time subsequent to the completion of the electrical connection but prior to the operation of said manually effectable separation means thereby to accommodate said threaded remnant end portion through said spaced through openings; and retaining means being a fastening member at the opposite end of each of said elongate attachment rods supporting the fixture temporarily at a distance from said attachment tabs selected to provide access sufficient to enable manipulation of said electrical wires and electrical lead wires so as to effect said electrical connection and engagable with said threaded remnant end portion permanently to support the fixture whereby to complete the installation of the electrical fixture.

15. The electrical fixture installation assist means according to claim 14 in which said manually effective separation means comprise a manually operable break-off notch formed in said attachment rods at said selected location.

16. The electrical fixture installation assist means according to claim 14 and additional retaining means comprising an additional fastening member engaging said remnant end portion.

* * * * *